(12) United States Patent
Utsuno et al.

(10) Patent No.: US 11,679,437 B2
(45) Date of Patent: Jun. 20, 2023

(54) COMPRESSED POWDER MAGNETIC CORE, POWDER FOR MAGNETIC CORE, AND PRODUCTION METHODS THEREFOR

(71) Applicant: DENSO CORPORATION, Kariya (JP)

(72) Inventors: Seishi Utsuno, Nagakute (JP); Jung Hwan Hwang, Nagakute (JP); Ken Matsubara, Kariya (JP); Masataka Mitomi, Kariya (JP)

(73) Assignee: DENSO CORPORATION, Kariya (JP)

( * ) Notice: Subject to any disclaimer, the term of this patent is extended or adjusted under 35 U.S.C. 154(b) by 457 days.

(21) Appl. No.: 16/755,858

(22) PCT Filed: Oct. 17, 2018

(86) PCT No.: PCT/JP2018/038678
§ 371 (c)(1),
(2) Date: Apr. 13, 2020

(87) PCT Pub. No.: WO2019/078257
PCT Pub. Date: Apr. 25, 2019

(65) Prior Publication Data
US 2021/0210258 A1 Jul. 8, 2021

(30) Foreign Application Priority Data
Oct. 17, 2017 (JP) .............................. JP2017-200706

(51) Int. Cl.
*H01F 1/147* (2006.01)
*B22F 1/16* (2022.01)
(Continued)

(52) U.S. Cl.
CPC .......... *H01F 1/14766* (2013.01); *B22F 1/102* (2022.01); *B22F 1/16* (2022.01);
(Continued)

(58) Field of Classification Search
CPC ................. H01F 3/08; H01F 1/24; B22F 1/14
See application file for complete search history.

(56) References Cited

U.S. PATENT DOCUMENTS

| 7,083,760 B2 | 8/2006 | Kondo et al. |
| 2002/0034453 A1 | 3/2002 | Kondo et al. |

FOREIGN PATENT DOCUMENTS

| JP | 3309970 B | 7/2002 |
| JP | 2003151813 A | 5/2003 |

(Continued)

OTHER PUBLICATIONS

International Search Report issued in PCT/JP2018/038678, dated Jan. 15, 2019; ISA/JP (in English and Japanese).
(Continued)

*Primary Examiner* — Adam Krupicka
(74) *Attorney, Agent, or Firm* — Harness, Dickey & Pierce, P.L.C.

(57) ABSTRACT

A dust core that can significantly reduce the iron loss is provided. The dust core of the present invention includes soft magnetic particles comprising pure iron or an iron alloy and a grain boundary layer existing between adjacent soft magnetic particles. The grain boundary layer has a compound layer comprising $M_xFe_{2-x}SiO_4$ (0≤x≤1, M: one or more types of metal elements that serve as divalent cations). Such a dust core is obtained by annealing a compact. The compact is obtained by compression-molding a powder for magnetic cores. In the powder for magnetic cores, coating layers that coat the surfaces of soft magnetic particles are each composed of a composite phase in which spinel-type ferrite represented by $M_yFe_{3-y}O_4$ (0≤y≤1, M: one or more types of metal elements that serve as divalent cations) is dispersed on a surface of a silicone resin or inside the silicone resin. The dust core after annealing exhibits a high
(Continued)

specific resistance due to the grain boundary layer having the compound layer and can reduce both the eddy-current loss and the hysteresis loss.

6 Claims, 2 Drawing Sheets

(51) Int. Cl.
    *H01F 3/08*     (2006.01)
    *B22F 3/24*     (2006.01)
    *H01F 41/02*     (2006.01)
    *B22F 1/102*     (2022.01)

(52) U.S. Cl.
    CPC ............ *B22F 3/24* (2013.01); *H01F 41/0246* (2013.01); *B22F 2003/248* (2013.01); *B22F 2301/35* (2013.01); *B22F 2302/45* (2013.01); *B22F 2998/10* (2013.01); *H01F 3/08* (2013.01)

(56) References Cited

FOREIGN PATENT DOCUMENTS

| | | |
|---|---|---|
| JP | 4024705 B | 12/2007 |
| JP | 2009147176 A | 7/2009 |
| JP | 2009185312 A | 8/2009 |
| JP | 2009246256 A | 10/2009 |
| JP | 2013191839 A | 9/2013 |
| JP | 2014060183 A | 4/2014 |
| JP | 2014183199 A | 9/2014 |
| JP | 2016086124 A | 5/2016 |
| JP | 2016127042 A | 7/2016 |

OTHER PUBLICATIONS

Notification of Reasons for Refusal regarding Japanese Application No. 2018-195904, dated Oct. 6, 2020. Translation provided by Sansui Patent Firm.
International Preliminary Report on Patentability and Written Opinion of the International Searching Authority regarding International Application No. PCT/JP2018/038678, dated Apr. 21, 2020.
Office Action regarding Swedish Patent Application No. 2050375-1, dated Dec. 1, 2020.
Notification of Reasons for Refusal regarding Japanese Application No. 2018-195904, dated Jan. 26, 2021. Translation provided by Sansui Patent Firm.
Office Action regarding Chinese Patent Application No. 201880067490.3 dated May 31, 2021.
Office Action regarding Chinese Patent Application No. 201880067490.3 dated Jan. 28, 2021.

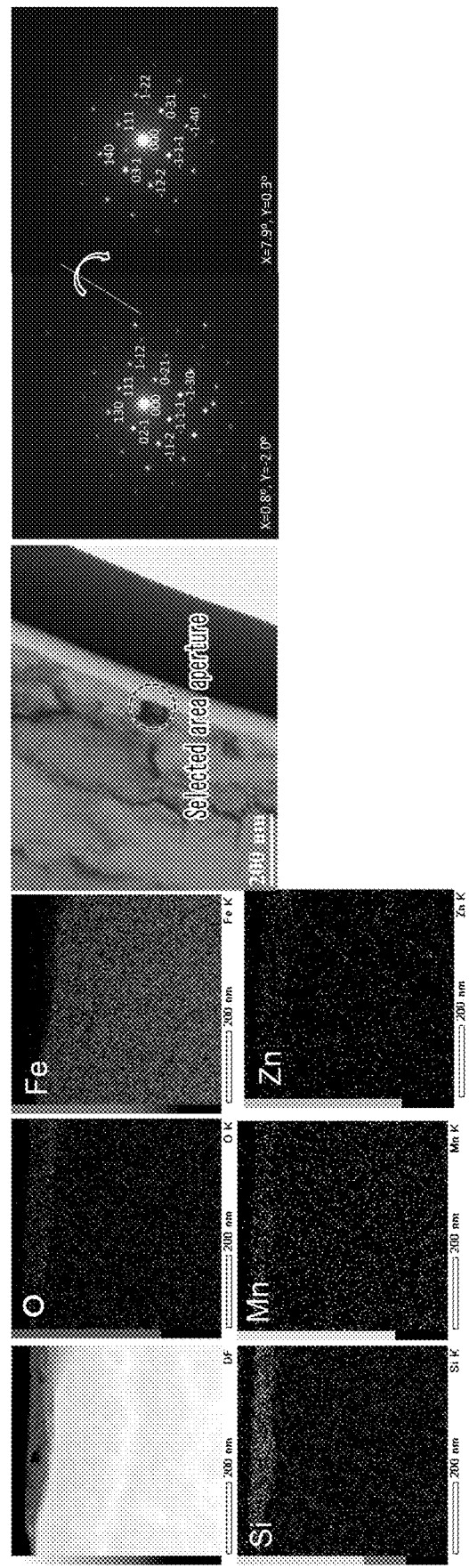
FIG.3 Structure of grain boundary layer

COMPRESSED POWDER MAGNETIC CORE, POWDER FOR MAGNETIC CORE, AND PRODUCTION METHODS THEREFOR

CROSS-REFERENCE TO RELATED APPLICATIONS

This application is a 371 U.S. National Phase of International Application No. PCT/JP2018/038678, filed on Oct. 17, 2018, which claims the benefit of priority from Japanese Application No. 2017-200706, filed on Oct. 17, 2017. The entire disclosures of the above applications are incorporated herein by reference.

TECHNICAL FIELD

The present invention relates to a compressed powder magnetic core (referred simply to as a "dust core," hereinafter) comprising soft magnetic particles and relates also to relevant techniques.

BACKGROUND ART

There are a considerable number of products using electromagnetism, such as transformers, motors, generators, speakers, inductive heaters, and various actuators. Many of them use an alternating magnetic field and are usually provided with a magnetic core (soft magnet) in the alternating magnetic field in order to obtain a large alternating magnetic field locally and efficiently.

Magnetic cores are required not only to have high magnetic properties in an alternating magnetic field but also to have a less high-frequency loss (referred to as an "iron loss," hereinafter, regardless of the material of magnetic core) when used in an alternating magnetic field. Examples of the iron loss include an eddy-current loss, a hysteresis loss, and a residual loss, among which the eddy-current loss is important and should be reduced because it increases with the square of the frequency of an alternating magnetic field.

Existing magnetic cores for reducing the eddy-current loss include a dust core comprising soft magnetic particles (particles of powder for magnetic cores) provided with an insulating layer between adjacent particles (grain boundary). Such dust cores are used in various electromagnetic devices because of a high degree of freedom in the shape. In general, the insulating layer of a dust core is composed of a resin, ceramics, glass, or other similar material, but the nonmagnetic insulating layer may deteriorate the magnetic properties (such as saturation magnetic flux density and permeability) due to the nonmagnetic properties. In this regard, there are proposed dust cores with insulating layers of spinel-type ferrite (also simply referred to as "ferrite") that is a magnetic material, and relevant descriptions are found in the following Patent Documents 1 to 3.

PRIOR ART DOCUMENTS

Patent Documents

[Patent Document 1] JP2003-151813A
[Patent Document 2] JP2016-127042A
[Patent Document 3] JP2016-86124A
[Patent Document 4] JP2009-246256A

SUMMARY OF INVENTION

Technical Problem

When dust cores are subjected to heat treatment (annealing) for removal of strain to reduce the hysteresis loss, however, the insulating layer of ferrite may alter to low-resistance $Fe_3O_4$ and/or FeO due to Fe that diffuses from the soft magnetic particles. Thus, it cannot necessarily be said that dust cores with ferrite insulating layers have sufficiently high specific resistance.

Patent Document 4 proposes a composite soft magnetic material (dust core) obtained through compression-molding a mixture of a binder solution (silicone resin) and ZnO powder with Mg-containing oxide-coated soft magnetic particles and then performing firing and high-temperature steam treatment thereon. Grain boundary layers formed here are composed of $[MgZnFe]Fe_2O_4+SiO_2$ (see FIG. 5 and [0042] of Patent Document 4). Also in this case, the specific resistance of the dust core after the heat treatment is not necessarily high, as in the cases of Patent Documents 1 to 3.

The present invention has been made in view of such circumstances and an object of the present invention is to provide a dust core of high specific resistance that has a novel insulating layer different from conventional ones at the grain boundaries of soft magnetic particles. Another object of the present invention is to provide relevant techniques thereto.

Solution to Problem

As a result of intensive studies to achieve the above objects, the present inventors have successfully obtained a dust core that ensures a high specific resistance even after heat treatment, by forming a novel insulating layer different from conventional ones at the grain boundaries of soft magnetic particles. Developing this achievement, the present inventors have accomplished the present invention as will be described hereinafter.

«Dust Core»

An aspect of the present invention provides a dust core comprising: soft magnetic particles comprising pure iron or an iron alloy; and a grain boundary layer existing between adjacent soft magnetic particles. The grain boundary layer has a compound layer comprising $M_xFe_{2-x}SiO_4$ ($0 \leq x \leq 1$, M: one or more types of metal elements that serve as divalent cations).

The dust core of the present invention can stably exhibit a high specific resistance even after exposed to a high-temperature environment and/or used for a long period of time. For example, even after heat treatment (annealing) is performed for the purpose of removing the strain which is introduced into the soft magnetic particles during compression molding, the insulating property is less likely to deteriorate, and the high specific resistance of the dust core can be stably ensured. According to the dust core of the present invention, therefore, both the reduced eddy-current loss due to the high insulating property of the grain boundary layer and the reduced hysteresis loss due to the lowered coercivity of the soft magnetic particles can be achieved at high levels, and the iron loss can thus be reliably reduced.

«Powder for Magnetic Cores»

(1) The present invention can be perceived also as a powder for magnetic cores that is a raw material of the dust core. That is, the present invention may also be a powder for magnetic cores that comprises coated particles. The coated particles have soft magnetic particles and coating layers that coat surfaces of the soft magnetic particles. The soft magnetic particles comprise pure iron or an iron alloy. The coating layers each comprise a composite phase in which spinel-type ferrite represented by $M_yFe_{3-y}O_4$ ($0 \leq y \leq 1$, M: one or more types of metal elements that serve as divalent cations) is dispersed on a surface of a silicone resin or inside the silicone resin.

When heat treatment (e.g., annealing for removal of strain) is performed on a compact (dust body) obtained by compression-molding the powder for magnetic cores of the present invention, the silicone resin as a first phase and the ferrite ($M_yFe_{3-y}O_4$) as a second phase react with each other to form the above-described compound layer comprising $M_xFe_{2-x}SiO_4$ at a grain boundary between the soft magnetic particles. The above-described dust core can thus be obtained.

(2) The present invention can be perceived further as a powder for magnetic cores as below. That is, the present invention may also be a powder for magnetic cores that comprises coated particles. The coated particles have soft magnetic particles and coating layers that coat surfaces of the soft magnetic particles. The soft magnetic particles comprise pure iron or an iron alloy. The coating layers are compound layers comprising $M_xFe_{2-x}SiO_4$ ($0 \leq x \leq 1$, M: one or more types of metal elements that serve as divalent cations).

The powder for magnetic cores of the present invention comprises the soft magnetic particles which are coated with the compound layers composed of $M_xFe_{2-x}SiO_4$ that already has a high resistance. The dust core composed of the powder for magnetic cores can exhibit a high specific resistance even without heat treatment. Of course, even when subsequent annealing for removal of strain or the like is performed, the dust core can exhibit a high specific resistance because the compound layers are excellent also in the heat resistance.

«Method of Manufacturing Powder for Magnetic Cores»

The above-described powder for magnetic cores can be obtained, for example, by a method of manufacturing as below. That is, there is provided a method of manufacturing a powder for magnetic cores. The method includes a resin coating step of coating surfaces of soft magnetic particles with a silicone resin. The soft magnetic particles comprise pure iron or an iron alloy. The method further includes a ferrite generating step of generating spinel-type ferrite on a surface of the silicone resin or inside the silicone resin. The spinel-type ferrite is represented by $M_yFe_{3-y}O_4$ ($0 \leq y \leq 1$, M: one or more types of metal elements that serve as divalent cations).

In this case, the powder for magnetic cores can be obtained, comprising the coated particles in which the coating layer of each soft magnetic particle is the above-described composite phase. When heat treatment is further performed on the coated particles, the powder for magnetic cores can be obtained, comprising the coated particles in which the coating layers are the above-described compound layers.

«Method of Manufacturing Dust Core»

The dust core of the present invention can be obtained, for example, by a method of manufacturing that includes a molding step of compression-molding the above-described powder for magnetic cores. When the coating layers of the powder for magnetic cores (coated particles) are each composed of the composite phase, the dust core having the above-described compound layer at a grain boundary can be obtained by performing an annealing step of heating a compact, obtained in the molding step, at 400° C. to 900° C. Even when the coating layers of the powder for magnetic cores (coated particles) are each composed of the composite phase, the annealing step is performed thereby to allow the hysteresis loss of the dust core to be reduced. It is preferred to perform the annealing step in a non-oxidizing atmosphere.

«Others»

(1) In the present specification, not only when one type of a metal element is used but also when plural types of metal elements are used, they are abbreviated as "M" for descriptive purposes. When M means a plurality of types of metal elements, "x" or "y" representing the composition ratio (atomic ratio) indicates the total of respective metal elements. For example, when M comprises Mn and Zn, "Mx" means $Mn_{x1}Zn_{x2}$, where $x=x1+x2$ and $0<x1\cdot x2$. The parameters "x" in $M_xFe_{2-x}SiO_4$ and "y" in $M_yFe_{3-y}O_4$ may be the same or may also be different.

(2) Unless otherwise stated, a numerical range "α to β" as referred to in the present specification includes the lower limit α and the upper limit β. Any numerical value included in various numerical values or numerical ranges described in the present specification may be selected or extracted as a new lower or upper limit, and any numerical range such as "a to b" can thereby be newly provided using such a new lower or upper limit.

BRIEF DESCRIPTION OF DRAWINGS

FIG. 3 is a set of element mapping images obtained by TEM observation of the grain boundary layer's cross section of a dust core according to Sample 1.

EMBODIMENTS FOR CARRYING OUT THE INVENTION

Figure 1:
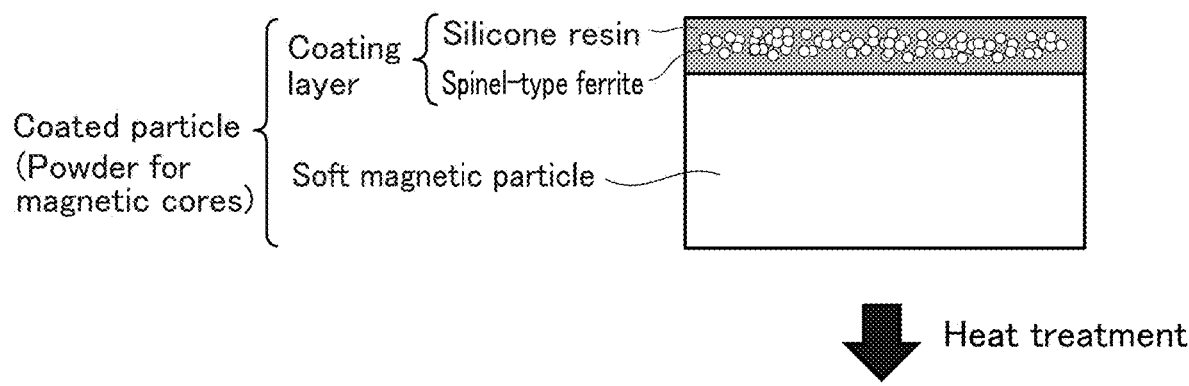
FIG. 1 is a schematic diagram illustrating a generation process of the compound layer according to the present invention.

One or more features freely selected from the present specification can be added to the above-described features of the present invention. The content described in the present specification can be applied not only to the dust core and powder for magnetic cores of the present invention but also to methods of manufacturing them. The content regarding a method can also be the content of a product.

«Compound Layer»

The compound layer is composed of $M_xFe_{2-x}SiO_4$ (also simply referred to as "the present compound"). The present compound has an orthorhombic crystal structure similar to that of fayalite ($Fe_2SiO_4$).

Examples of the metal element (M) contained in the present compound may include one or more types of Mn, Zn, Ni, Mg, and Cu in addition to Fe (corresponding to x=0). When M is such a metal element M, a crystal similar to fayalite is readily generated. In particular, when $0<x$, M may contain at least one of Mn and Zn, that is, M may consist of Mn and/or Zn. This applies to ferrite ($M_yFe_{3-y}O_4$), which will be described later. The parameters x and y may be set, for example, as $0<x$, $y<1$, $0.1 \leq x$, $y \leq 0.7$, $0.2 \leq x$, and/or $y \leq 0.5$.

As the compound layer exists so as to coat the surface (entire surface in an embodiment) of each soft magnetic particle in a film-like shape, the dust core can stably have a high specific resistance. The thickness of the compound layer is, for example, preferably 10 to 500 nm in an embodiment or 20 to 100 nm in another embodiment. If the thickness is unduly small, the specific resistance of the dust core is reduced, while if the thickness is unduly large, the magnetic properties of the dust core may deteriorate.

«Silicone Resin»

The silicone resin is a raw material for generating the compound layer and is a polymer compound having a siloxane bond (—Si—O—Si— bond). The silicone resin is preferably a heat-curable resin (simply referred to as a "thermosetting resin") because the thermosetting resin is more readily softened after heating and high interfacial adhesion can be obtained with the soft magnetic powder.

Silicone resins include various types such as resin-based, silane compound-based, rubber-based silicone, silicone powder, and organically modified silicone oil and a composite thereof. A resin-based silicone resin for coating, that is, a straight silicone resin composed only of silicone or a silicone resin for modification composed of silicone and an organic-based polymer (such as alkyd, polyester, epoxy, or acrylic), may preferably be used because the electrical insulating property is enhanced, the coating (resin coating step) is simplified, etc.

Specific examples of the silicone resin include 804RESIN, 805RESIN, 806A RESIN, 840RESIN, SR2400, Z-6018, 217FLAKE, 220FLAKE, 233FLAKE, 249FLAKE, SR2402, QP8-5314, SR2306, SR2316, SR2310, SE5060, SE5070, SE5004, and SR2404, all available from Toray Dow Corning Silicone Co., Ltd.

Specific examples of the silicone resin further include KR251, KR500, KR400, KR255, KR271, KR282, KR311, KR213, KR220, KR9218, KR5230, KR5235, KR114A, KR169, KR2038, K5206, KR9706, ES1001N, ES1002T, ES1023, KP64, and KP851, all available from Shin-Etsu Chemical Co., Ltd. As will be understood, silicone resins other than these brands may also be used. In an embodiment, a silicone resin obtained by mixing two or more types of silicone resins having different types, molecular weights, and functional groups at an appropriate ratio may be used.

The silicone resin content is, for example, 0.1 to 1 mass % in an embodiment or 0.15 to 0.6 mass % in another embodiment with respect to the soft magnetic powder as a whole (100 mass %/100 mass parts). If the silicone resin content is unduly small, a necessary compound layer is not formed, while if the silicone resin content is unduly large, the magnetic properties of the dust core may deteriorate. In terms of the powder for magnetic cores as a whole to which ferrite is given, the silicone resin content is preferably 0.05 to 0.8 mass % in an embodiment or 0.1 to 0.5 mass in another embodiment.

«Spinel-Type Ferrite»

Ferrite is also a raw material for generating the compound layer and is a type of iron oxide (ceramics) represented by $M_yFe_{3-y}O_4$ ($0 \leq y \leq 1$, preferably y=1) with a metal element (M), Fe, and O, where the metal element (M) serves as a divalent cation.

As illustrated in FIG. 1, the ferrite is dispersed on a surface of the silicone resin or inside the silicone resin at the stage of the powder for magnetic cores (coated particles). Accordingly, the composite phase in which the second phase composed of fine particle-like ferrite is dispersed in the first phase (matrix phase) composed of a film-like or layer-like silicone resin is in a state of being formed on a surface of the soft magnetic particles. When the composite phase is heated, the silicone resin and the ferrite react with each other, and the substantially uniform film-like or layer-like $M_xFe_{2-x}SiO_4$ is formed on a surface of the soft magnetic particles or at a grain boundary of the dust core.

At the stage of the powder for magnetic cores, even in a state in which the ferrite is generated (dispersed) on the surface of the silicone resin, when the powder for magnetic cores is compression-molded, the ferrite appears to be embedded in the silicone resin. At least at the stage of the dust core after annealing, the silicone resin and the ferrite appear to entirely react to form a substantially uniform compound layer composed of $M_xFe_{2-x}SiO_4$.

«Soft Magnetic Particles (Soft Magnetic Powder)»

The soft magnetic particles comprise pure iron or an iron alloy. Pure iron powder allows a high saturation magnetic flux density to be obtained and can readily improve the magnetic properties of the dust core. When a Si-containing iron alloy (Fe—Si alloy) powder, for example, is used as the iron alloy powder, its electrical resistivity is increased by Si, so that the specific resistance of the dust core can be improved and the eddy-current loss can be reduced accordingly.

In an alternative embodiment, the soft magnetic powder may be Fe-49Co-2V (permendur) powder, sendust (Fe-9Si-6Al) powder, or the like. The soft magnetic powder may also be a mixture of two or more types of powders. For example, a mixed powder of pure iron powder and Fe—Si alloy powder or the like may be used.

The particle size of the soft magnetic particles can be adjusted in accordance with the spec of the dust core. The particle size of the soft magnetic powder is preferably 50 to 300 μm in an embodiment or 106 to 250 μm in another embodiment. An unduly large particle size may readily lead to a low-density dust core and/or an increased eddy-current loss, while an unduly small particle size may readily reduce the magnetic flux density of the dust core and/or increase the hysteresis loss.

As referred to in the present specification, the "particle size" is indicative of the size of the soft magnetic particles and specified by sieving. Specifically, the upper limit (d1) and lower limit (d2) of the mesh size used for the sieving are employed to indicate the particle size (D), such as d1~d2 or d2~d1.

The soft magnetic powder is obtained, for example, using an atomization method, a mechanical milling method, a reduction method, or other similar method. The atomized powder may be any of a water-atomized powder, a gas-atomized powder, and a gas-water-atomized powder. The atomized powder (in particular, the gas-atomized powder) having approximately spherical particles contributes to a high specific resistance of the dust core because breakage of the film and other troubles are less likely to occur when forming or molding the dust core.

«Method of Manufacturing Powder for Magnetic Cores»

(1) Resin Coating Step

The resin coating step can be performed by applying the silicone resin to the surfaces of the soft magnetic particles. The application of the silicone resin can be performed, for example, by a spray method, an immersion method, or other appropriate method. It is sufficient for the silicone resin to thinly coat the surfaces of the soft magnetic particles; therefore, depending on the viscosity, it is usually preferred to use a resin solution diluted with a solvent.

When the silicone resin is a thermosetting resin, the resin coating step preferably includes an application step of applying the silicone resin to the surfaces of the soft magnetic particles and a curing step of thermally curing the silicone resin after the application step. The curing step can improve the interfacial adhesion of the silicone resin to the surfaces of the soft magnetic particles. A drying step may be separately performed after the application step and before the curing step, or the curing step may also serve as the drying step. Depending on the type of the silicone resin, the curing step is preferably performed at 150° C. to 300° C. in an embodiment or 200° C. to 250° C. in another embodiment for about 30 to 60 minutes. When the drying step is separately performed, the heating temperature is preferably set to 60° C. to 150° C. in an embodiment or 100° C. to 120° C. in another embodiment.

(2) Ferrite Generating Step (Ferrite Plating Step)

The ferrite generating step can be performed, for example, using an aqueous solution method in which a powder to be treated (soft magnetic powder) is immersed in a reaction liquid (generation liquid) (reference: JP2013-191839A), a spray method in which a reaction liquid is sprayed to a powder to be treated (reference: JP2014-183199A), a one-liquid method using a reaction liquid that contains urea (reference: JP2016-127042A), or other similar method. Any method can be employed to generate the ferrite according to the present invention.

The ferrite generating step may be repeated depending on the film thickness of the ferrite or the like. After the ferrite generating step, a washing step of removing unnecessary substances may be performed. The washing step is carried out using an alkaline aqueous solution, water, ethanol, or other appropriate liquid. Unnecessary substances to be washed are ferrite particles that did not contribute to the film formation, chlorine and sodium contained in the treatment liquid (reaction liquid, pH adjustment liquid), etc. After the washing step, the powder may be dried. The drying step may include drying by heating rather than natural drying, and in this case the powder for magnetic cores can be efficiently manufactured.

(3) When manufacturing the powder for magnetic cores comprising the coated particles coated with the compound layers composed of $M_xFe_{2-x}SiO_4$, it is preferred to further heat the powder after the ferrite generating step. For example, the powder obtained in the ferrite generating step is preferably heated at 400° C. to 900° C. in an embodiment or 600° C. to 750° C. in another embodiment in a non-oxidizing atmosphere.

«Method of Manufacturing Dust Core»

(1) Molding Step

As the powder for magnetic cores is molded at a higher pressure, a dust core having a higher density and a higher magnetic flux density can be obtained. Note, however, that an unduly high molding pressure causes the reduction in productivity and/or an increase in cost. It is therefore preferred to adjust the molding pressure to 600 to 1600 MPa in an embodiment or 800 to 1200 MPa in another embodiment. When a mold lubrication warm high-pressure molding method (detailed in JP3309970B and JP4024705B) is used, ultrahigh pressure molding can be performed while extending the life of the mold.

(2) Annealing Step

The annealing step can remove the strain introduced into the soft magnetic particles in the molding step, and the hysteresis loss due to the strain is reduced. When using the powder for magnetic cores comprising the soft magnetic particles (coated particles) coated with the composite phase, the annealing step allows the compound layer composed of $M_xFe_{2-x}SiO_4$ to be formed as a grain boundary layer of the dust core.

Preferably, the annealing step includes, for example, heating at 400° C. to 900° C. in an embodiment or 600° C. to 750° C. in another embodiment for 0.1 to 2 hours in an embodiment or 0.5 to 1 hour in another embodiment in a non-oxidizing atmosphere. The non-oxidizing atmosphere as referred to in the present specification is an inert gas atmosphere, a nitrogen gas atmosphere, a vacuum atmosphere, or other similar atmosphere.

«Dust Core»

The specific resistance (in particular, the specific resistance after the annealing) of the dust core is preferably 100 $\mu\Omega m$ or more in an embodiment, 1000 $\mu\Omega m$ or more in another embodiment, or 10000 $\mu\Omega m$ or more in still another embodiment.

The dust core can be used, for example, in electromagnetic devices such as motors, actuators, transformers, inductive heaters (IH), speakers, and reactors. In particular, the dust core is preferably used as an iron core that constitutes an armature (rotor or stator) of an electric motor or a generator.

Examples

Dust cores were manufactured using respective powders for magnetic cores having different coated layers of the soft magnetic particles. Properties of each dust core were measured and the structures of the grain boundary layers were observed. The present invention will be described in more detail with reference to such examples.

«Manufacturing of Powder for Magnetic Cores»

(1) Soft Magnetic Powder (Raw Material Powder)

Gas-atomized powder comprising pure iron was used as the soft magnetic powder. The particle size was 212~106 How to specify the particle size is as previously described.

(2) Resin Coating Step

A resin solution was prepared by dissolving a silicone resin (Shin-Etsu Silicone KR220L available from Shin-Etsu Chemical Co., Ltd.) as a thermosetting resin in isopropyl alcohol. The resin solution was sprayed and applied to the raw material powder which was being heated (60° C. to 100° C.) and stirred (coating step). The spray amount was adjusted so that the silicone resin content would be 0.2 mass % with respect to the raw material powder (100 mass %).

The raw material powder after the application step was heated at 220° C. for 60 minutes in a nitrogen atmosphere. Thus, the silicone resin layers applied to the surfaces of the soft magnetic particles were thermally cured.

(3) Ferrite Generating Step

The soft magnetic powder after the resin coating step was stirred while being heated to 130° C. in the air with a mantle heater, and the ferrite generation liquid (reaction liquid) was sprayed to the powder. Two types of generation liquids were prepared as follows. One generation liquid was prepared by dissolving manganese chloride ($MnCl_2$), zinc chloride ($ZnCl_2$), and iron chloride ($FeCl_2$) weighed at a molar ratio of 0.5:0.5:2 in ion-exchange water (Sample 1). The other generation liquid was prepared by dissolving only iron chloride ($FeCl_2$) in ion-exchange water (Sample 2). These generation liquids exhibited pH 8.

The powder after the spray treatment with each generation liquid was washed with pure water (washing step) and dried by heating to 100° C. (drying step). Thus, the ferrite layer (second phase) composed of $Mn_{0.5}Zn_{0.5}Fe_2O_4$ (Sample 1) or $Fe_3O_4$ (Sample 2) was further generated on the silicone resin layer (first phase) coating each of the soft magnetic particles (ferrite generating step). In this way, the powders for magnetic cores (Samples 1 and 2) were obtained, each comprising the soft magnetic particles (coated particles) having the coating layers (composite phases) composed of silicone resin layers and ferrite layers. The ferrite generating step was conducted also with reference to the description of JP2014-183199A.

(4) Comparative Sample

A comparative sample was also manufactured as a powder for magnetic cores for which only the ferrite generating step was carried out using the same generation liquid as that for Sample 1 without performing the above-described resin coating step (Sample C1).

«Manufacturing of Dust Core»

(1) Molding Step

The powder for magnetic cores according to each sample was molded at 1200 MPa using a mold lubrication warm high-pressure molding method (references: JP3309970B and JP4024705B). Thus, a compact having a ring shape (40×30×4 mm) was obtained.

(2) Annealing Step

The compact according to each sample was placed in a heating furnace and heated at 600° C. for 1 hour in a nitrogen atmosphere (non-oxidizing atmosphere). Thus, the dust core according to each sample was obtained.

«Measurement»

Figure 2:
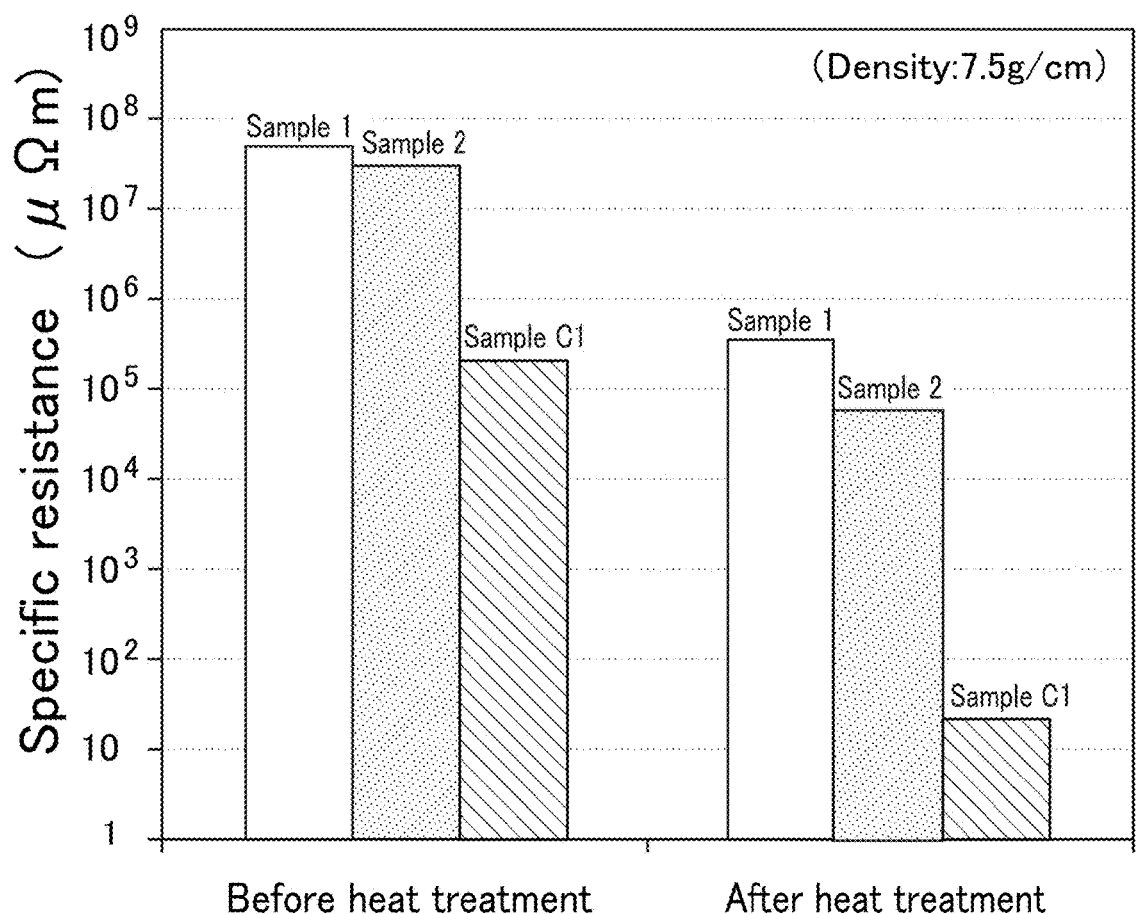
FIG. 2 is a bar graph illustrating the specific resistance of dust cores before and after heat treatment according to the samples.

The specific resistance of the dust core before and after the annealing step according to each sample was measured by a four-terminal method (JIS K7194) using a digital multimeter (R6581 available from ADC Corporation). The obtained measurement results are illustrated in FIG. 2.

«Observation»

The cross section (mainly the grain boundary layer) of the dust core according to each sample was observed using a transmission electron microscope (TEM) and energy-dispersive X-ray spectroscopy (EDX). Examples of the element mapping images thus obtained (Sample 1) are shown in FIG. 3.

«Evaluation»

(1) Specific Resistance and Coercivity

As apparent from FIG. 2, both before and after the heat treatment (annealing), Samples 1 and 2 exhibit higher specific resistance than that of Sample C1. In particular, as apparent from the comparison between those after the heat treatment, it has been found that the specific resistance of Sample C1 sharply decreases to less than 100 µΩm whereas the specific resistance of Samples 1 and 2 is maintained at a very high state of about $10^5$ µΩm.

When the dust cores after the heat treatment according to Samples 1 and 2 are used, therefore, both the reduced eddy-current loss and the reduced hysteresis loss can be achieved at high levels, and the iron loss can thus be reliably reduced.

(2) Structure of Grain Boundary Layer

As apparent from FIG. 3, the grain boundary layer of Sample 1 is composed of Fe, Si, O, Mn, and Zn, and its thickness is about 70 nm. From the results of the composition analysis, it has been confirmed that the grain boundary layer is a compound layer composed of $(Mn,Zn)_xFe_{2-x}SiO_4$ (x=about 0.2). Likewise, it has been confirmed that the grain boundary layer of Sample 2 is a compound layer composed of $Fe_2SiO_4$ (x=0).

From the above, it has been revealed that the dust core of the present invention having the compound layer composed of $M_xFe_{2-x}SiO_4$ at a grain boundary of the soft magnetic particles can reduce both the eddy-current loss and the hysteresis loss and can sufficiently suppress the iron loss.

The invention claimed is:

1. A dust core comprising:
   soft magnetic particles comprising pure iron or an iron alloy; and
   a grain boundary layer existing between adjacent soft magnetic particles,
   the grain boundary layer having a compound layer comprising $M_xFe_{2-x}SiO_4$ 0<x≤1, M: metal elements that contain at least Mn and Zn that serve as divalent cations).

2. The dust core according to claim 1, wherein the compound layer coats a surface of the soft magnetic particles in a film-like shape.

3. The dust core according to claim 1, wherein the compound layer has a thickness of 10 to 200 nm.

4. The dust core according to claim 1, wherein M further comprises at least one of Ni, Mg, and Cu.

5. The dust core according to claim 4, wherein x is 0.1≤x≤0.5.

6. The dust core according to claim 1, having a specific resistance of 100 µΩm or more.

* * * * *